United States Patent [19]

Haeusler

[11] B 3,925,649

[45] Dec. 9, 1975

[54] ELECTRONIC COMPUTER FOR THE STATIC RECOGNITION OF THE DIVISIBILITY, AND THE DIVISION OF, NUMBERS DIVISIBLE BY THREE, SIX AND NINE

[75] Inventor: Jochen Haeusler, Nurnberg-Laufamholz, Germany

[73] Assignee: Siemens Aktiengesellschaft, Munich, Germany

[22] Filed: Apr. 30, 1973

[21] Appl. No.: 355,595

[44] Published under the Trial Voluntary Protest Program on January 28, 1975 as document no. B 355,595.

[30] Foreign Application Priority Data

May 18, 1972 Germany ........................... 2224329

[52] U.S. Cl. ................. 235/159; 235/156; 235/160

[51] Int. Cl.² ............................................ G06F 7/39

[58] Field of Search ............ 235/152, 156, 159, 160

[56] References Cited

UNITED STATES PATENTS

| | | | |
|---|---|---|---|
| 3,591,787 | 7/1971 | Frieman | 235/156 X |
| 3,610,905 | 10/1971 | Herron et al. | 235/156 X |
| 3,633,018 | 1/1971 | Ling | 235/156 X |
| 3,648,038 | 5/1972 | Sierra | 235/156 X |

*Primary Examiner*—Charles E. Atkinson
*Assistant Examiner*—James F. Gottman
*Attorney, Agent, or Firm*—Kenyon & Kenyon Reilly Carr & Chapin

[57] ABSTRACT

An electronic computer for the static recognition of the divisibility, and the division, of numbers which are divisible by the integers 3, 6 and 9, comprising a first adder, for summing the digits of the dividend; a first comparator, for determining the divisibility of the sum of the digits of the dividend by the integers 3, 6 and 9; a second adder, for determining an integer *n* from the carrys of the sum of the digits of the dividend, and the dividend; a third adder, for determining the quotient of the dividend divided by the integer 9; a multiplier for tripling the integer *n* determined by the second adder; a fourth adder, for determining the quotient of the dividend divided by the integer 3; a second comparator, for determining the divisibility of the dividend by 6; and a divider, for determining the quotient of the dividend divided by the integer 6.

6 Claims, 4 Drawing Figures

ELECTRONIC COMPUTER FOR THE STATIC RECOGNITION OF THE DIVISIBILITY, AND THE DIVISION OF, NUMBERS DIVISIBLE BY THREE, SIX AND NINE

BACKGROUND OF THE INVENTION

1. Field of the Invention

The invention relates to electronic computing devices, and in particular to an electronic computer for the static recognition of the divisibility, and for carrying out the division, of numbers which are divisible by the integers 3, 6 and 9.

2. Description of the Prior Art

Known electronic computers generally utilize one of several known methods to divide numbers which are represented in digital form. One such method is parallel addition which reduces the division to an iterated subtraction operation. Logical parallel addition circuits for electronic computers are generally well known. Since the division operation in the parallel addition method depends upon subtractive iteration, the computation time of such a logic circuit will vary with each number divided by the circuit. The division of digital numbers may also be carried out by a pulse counting method, in which the dividend and the quotient of the number divided are obtained dynamically and simultaneously. Digital incremental encoders and analog-to-digital converters having voltage-frequency converters are examples of devices which divide digital numbers by means of this method.

Still another method of division of digital numbers is static division, in which the quotient of the number is obtained by a plurality of logically interconnected input states. (Dynamic division, on the other hand utilizes iterated subtraction or frequency division, and analyzes not only the input states, but also variable changes of the input states.) If a static division method is utilized, however, due to the absence of the operation of dynamic division, and further, due to the memory behavior of the division circuit, it is preferable that the static division circuit be relatively unaffected by interference signals. Although dividers for dividing numbers by $2^n$, particularly for dividing binary coded decimal numbers, may be constructed by using conventional binary division techniques using left-right digit shifts, there are at present no static dividing circuits for carrying out the division of digital numbers by the integers 3, 6 and 9.

SUMMARY OF THE INVENTION

Accordingly, it is an object of the invention to provide an electronic computer for the static recognition of the divisibility, and for the carrying out of the division, of numbers which are divisible by the integers 3, 6 and 9.

In achieving the above objective, the invention provides an electronic computer, comprising, a first adder for determining the sum of the digits of the dividend N; a first comparator, for determining the divisibility of the total sum of the dividend digits by the integers 3, 6 and 9; a second adder, for determining from the carrys of the summing of the dividend digits, and the dividend, the integer $n$ which comprises the nearest integer which is less than the quotient N/9; a third adder, for determining the quotient N/9; a multiplier, for tripling the quotient N/9 and the integer $n$; a fourth adder, for determining the quotient of the dividend divided by the integer 3; a second comparator, for determining the divisibility of the dividend by the integer 6 by ascertaining whether the unit digit of the quotient N/3 is an even or odd digit; and a divider, for determining the quotient of the dividend divided by the integer 6 by halving the quotient N/3.

The advantage of the electronic computer disclosed herein over conventional computing devices resides in the feature that a pair of characteristic numerical quantities, the total sum of the digits of the dividend $q_r$, and the nearest integer $n$, which is less than the quotient N/9, are derived for the dividend N divided, which determination permits the static computation of the quotient N/3 by logically interconnected conventional electronic circuit devices. Only an addition operation is required in the computation of the quotients in the inventive device, and known integrated circuits are available for carrying out this function. The total sum $q_r$ of the digits of the dividend N is determined by repeated summing of the digits thereof until the sum $q_r$ is less than or equal to the integer 9. In classical determinations of a sum of a plurality of digits of a number, which comprise merely adding the individual number digits, sums comprising several digits can be obtained, and as a result, there can be no simple criteria of divisibility of the number. In the inventive device, however, the sum of the dividend digits yields only numbers which are less than or equal to the integer 9, and the nearest integer $n$ which is less than the quotient N/9. Thus, all numbers divisible by the integer 3 are characterized by a digit sum which is equal to the integers 3, 6 or 9. This simple criteria for determining the divisibility of a number has heretofore never been utilized in an electronic computer. Furthermore, the steps carried out to obtain the formation of the sum of the dividend digits are also utilized to represent the integer $n$ for the first time both in an electronic computer and in a method of static division. It was heretofore unknown that the integer $n$ could be derived solely by pure addition. The invention thus provides an electronic computer in which statically obtained binary coded decimal signals are statically divided by the integer 3, and by derivation from the quotient thereof, are divided by the integers 6 and 9.

BRIEF DESCRIPTION OF THE DRAWINGS

In the drawings, wherein similar reference numerals denote similar elements throughout the several views.

DETAILED DESCRIPTION

Figure 1:
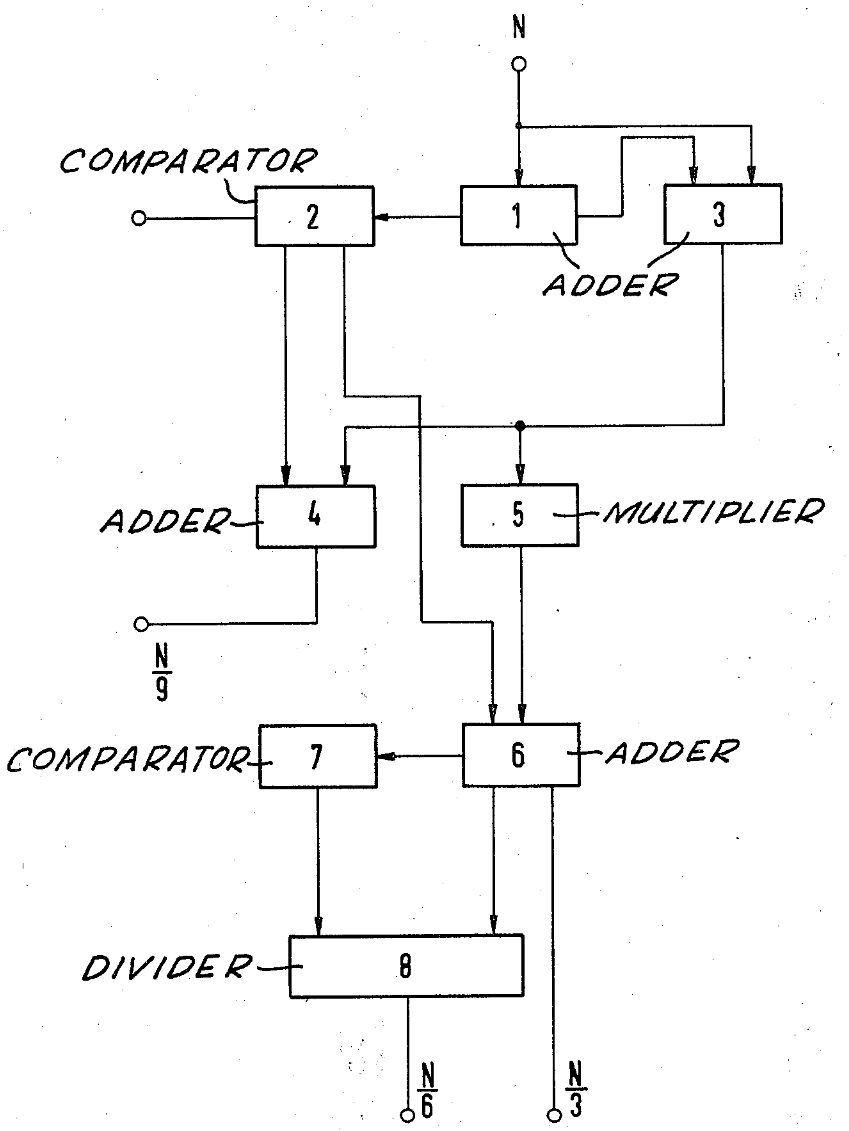
FIG. 1 is a schematic block diagram of an electronic computer constructed according to the invention.

The following description of the construction and operation of the electronic computer of the invention will be described with reference to the division of a three-digit number. It will be understood, however, that the principles underlying the operation described may be applied to the division of any multidigit number.

If the number to be divided, i.e., the dividend N, is equal to $$\sum_{u=0}^{r} a_u 10^u,$$

wherein $a_0$ denotes units, $a_1$ denotes tens, $a_2$ denotes hundreds, etc., then the nearest whole integer which is less than the quotient of the dividend N divided by the integer 9, i.e., N/9, is equal to $$\sum_{u=0}^{r} a_u \left[\frac{10^u}{9}\right] + \sum_{u=1}^{r} q_{u1}.$$

The term $$\sum_{u=0}^{r} a_u \left[\frac{10^u}{9}\right],$$

thus, denotes the nearest whole integer which is less than the quantity (10μ )/9, this latter quantity being equal to 1,1 · (10 μ - i.e., the digits $a_u$ are multiplied by numbers containing only the digit 1, which multiplication operation comprises a simple addition of the numbers $a_u$ in different decades where no carrys appear. The integer 1 must always be added as a carry to the results of this multiplication operation when, in summing the digits of the dividend N, which begins with the addition of the units and tens of the number, a number greater than or equal to the integer 10 is obtained. For example, the first summing of the digits $u_1$ which are formed of units $a_0$ and tens $a_1$, can produce the two digit result $q_1 = a_0 + a_1 = q_{11}\ (10^1) = q_{10}\ (10^0)$, wherein $q_{11}$ represents the tens of the first sum of the digits, and $q_{10}$ represents the units of the first sum of the digits. In the second sum of the digits, during which the hundreds of the dividend N are included, hundreds $a_2$ are added to $q_{10}$, and the result $q_2 = q_{10} + a_2 = q_{21}\ (10^1) = q_{20}\ (10^0)$ is thereby obtained. The quantity $q_2$ represents the second summing of the digits, and $q_{21}$ and $q_{20}$ represent the sums of the tens and units, respectively, of the second sum of the digits. From this is derived the general expression, $q_u = q_{u1}\ (10^1) + q_{uo}\ (10^0)$, wherein $q_u$ represents $u$-th sum of the digits of the dividened N and $q_{u1}$ and $q_{uo}$ represent the tens and units of the $u$-th sum of the digits. As stated previously, all $q_{u1}$, which are either 0 or 1, must be considered in the computation of $n$. These carrys must be considered throughout the summing of the digits, which operation ends only when the final total sum of the digits $q_r$ is less than or equal to the integer 9.

Referring now to the drawings, specifically FIG. 1, the electronic computer of the invention is shown in schematic form, and comprises means for summing the digits of the binary coded decimal dividend N, shown as first adder 1, which sum is designated $q_r$. This sum is transmitted to means for indicating the divisibility of the sum $q_r$ by the integers 3, 6 and 9, shown as a comparator 2 which is coupled to adder 1. The comparator generates at least one output signal which indicates that the dividend N is evenly divisible by the integer 3. If it is so determined, the comparator releases the digit sum $q_r$. The carrys of the dividend N digit sum $q_r$ which occur during the summing of the digits by adder 1 and the dividend digits, are transmitted to means for determining the nearest integer which is less than the quotient produced by dividing the dividend by the integer 9, i.e., N/9, shown as a second adder 3 coupled to first adder 1. Adder 3 computes the value of $n$, which, as previously stated, refers to the nearest integer less than N/9 and is determined by the equation set forth above. The sum of the dividend digits $q_r$, and the integer $n$, are the only two quantities required to compute the quotients of the dividend N divided by the integers 3, 6 and 9, respectively, which are given by the following equations:

$$N/9 = n + q_r/9 \qquad (1)$$

$$N/3 = 3\ (n + q_r/9) = 3n + q_r/3 \qquad (2)$$

$$N/6 = ½\ (3n + q_r/3) \qquad (3)$$

Since when the dividend N is divisible by the integer 9, $q_r = 9$, and when N is divisible by the integer 3, $q_r =$ 3, 6 or 9, the integer $n$ is added only to whole integers 1, 2 or 3. The addition of equation (1) above, which is equivalent to $n + 1$, is carried out by means for determining the quotient N/9, shown as third adder 4 coupled to comparator 2 and second adder 3. The addition of equation (2) is carried out by means for determining the quotient N/3, shown as a fourth adder 6. The determination of N/3, however, requires that the quotient N/9 be tripled, which is carried out by multiplying means, illustrated as multiplier 5, coupled to the output of second adder 3 and to the input of fourth adder 6, which triples the value of the sum ($n = q_r/9$) by means of an additive operation.

The addition of equation (3) above is carried out by means for determining the quotient N/6, shown as a second comparator 7 and divider 8 coupled to the output of adder 6. The comparator analyzes the quotient N/3 to determine whether the unit digit thereof is even or odd. If the unit digit of the quotient N/3 is even, the divider 8 halves the quotient by shifting it to the right according to known methods, thereby leaving no remainder. When the unit digit of the quotient is odd, the divider leaves a remainder of one-half after the decimal point of the number.

Figure 2:
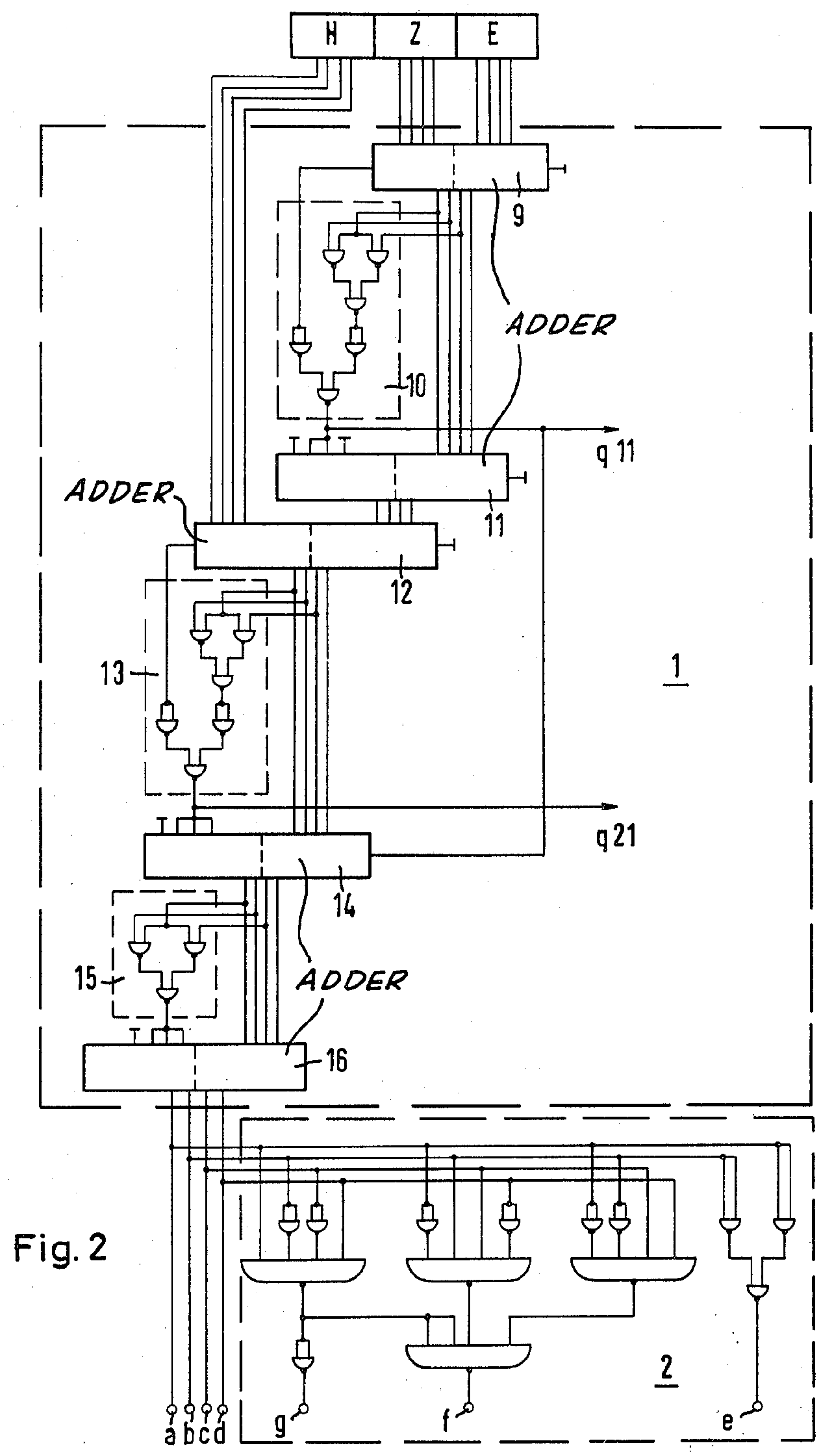
FIG. 2 is a schematic circuit diagram of the first adder and first comparator of the electronic computer of the invention.

FIG. 2 illustrates an example of an embodiment of first adder 1 for an electronic computer used to divide a 3 decade number represented in binary coded decimal form, i.e., a dividend N lying between the numbers 000 and 999, inclusive. Adder 1 determines the carrys of the sums of digits $q_{11}$ and $q_{21}$ and the dividend digit sum $q_r$, the latter of which is represented by binary signals appearing at output terminals $a$-$d$ thereof. The three decades of the dividend number N are designated as H, representing hundreds, C, representing tens, and E, representing units. The decades are each represented in binary coded decimal form by four binary digits assigned the weights $2^3$, $2^2$, $2^1$, $2^0$, i.e., 8, 4, 2 and 1, transmitted over the four illustrated separate transmission lines. The unit and tens digits of the dividend N, E and Z, respectively, are transmitted to a four bit adder block 9, where they are added. Adder block 9 may, for example, comprise a TTL integrated circuit having a carry input and output, such as Siemens No. FLH241, or Texas Instruments No. SN7483N. The sum of the unit and tens digits appears directly at the output of adder block 9 if it is less than or equal to the integer 15 (i.e., less than or equal to $2^0 + 2^1 + 2^2 + 2^3$). The integer sums 16, 17 and 18 are represented by means of a carry as a binary number having five digits.

The output signals of adder block 9 are pure binary signals and must be recoded into a decade representation. A recoding means, shown as a recoding network 10 coupled to adder block 9, is therefore provided. The network comprises a plurality of interconnected TTL NAND logic gates which generate the sum of the digits $q_{11}$ at the output terminal thereof. In furtherance of this purpose, a second adder block 11 is coupled to the recoding network and to first adder block 9, which adds to the output of adder block 9 the integer 6 ($2^1 + 2^2$) whenever the sum of the output signals of adder block 9 is greater than or equal to the integer 10 (i.e., ($2^3 + 2^1$) or ($2^3 + 2^2$)). The first sum of the unit digits $q_{10}$ then appears at the output of second adder block 11. The sums of the unit tens digits $q_{10}$ and $q_{11}$ are then available for the computation of the integer $n$. The sum $q_{11}$ is then transmitted directly to the carry input of a fourth adder block 14. A third adder block 12, which is coupled to second adder block 11, sums the hundreds digits H of dividend N and $q_{10}$ and adds thereto the integer 7 ($2^1 + 2^2 + 2^0$) by means of another recoding network 13, which is similar to network 10, when the sum of $q_{10}$ and H is greater than or equal to the integer 10. The second sum of the tens digits $q_{21}$ appears at the output of recoding network 13. Since after the addition of the integer 7 by network 13 the carry input and the $2^0$ bit position input of fourth adder block 14 are free, the adder block sums the two carrys. Since this summation can also generate a two decade number, recoding network 15 is coupled to the output of adder block 14, and adds to the output sum of adder block 14 in adder block 16 the integer 7 when the output sum of adder block 14 is greater than or equal to the integer 10. The total sum of the dividend digits $q_r$, which is less than or equal to the integer 9, appears at output terminals *a–d* of adder block 16 in binary decimal coded form.

Comparator 2 is coupled to output terminals *a–d* of adder block 16 and comprises a plurality of interconnected NAND logic gates. The comparator generates an output signal at its terminal $g$ whenever $q_r$ contains signals in bit positions $2^3$ and $2^0$, thereby indicating divisibility by the integer 9; at its output terminal $f$ whenever $q_r$ has signals in bit positions totalling 3, 6 or 9, thereby indicating divisibility by the integer 3; and at output terminal $e$ whenever $q_r$ contains signals in bit positions $2^3$ or $2^2$ thereby indicating divisibility by the integer 6. The output signals at terminal $d$ of adder block 16, and the terminals $e$ and $g$ of comparator 2, are required for the final computation of the quotients N/3 and N/9.

Figure 3:
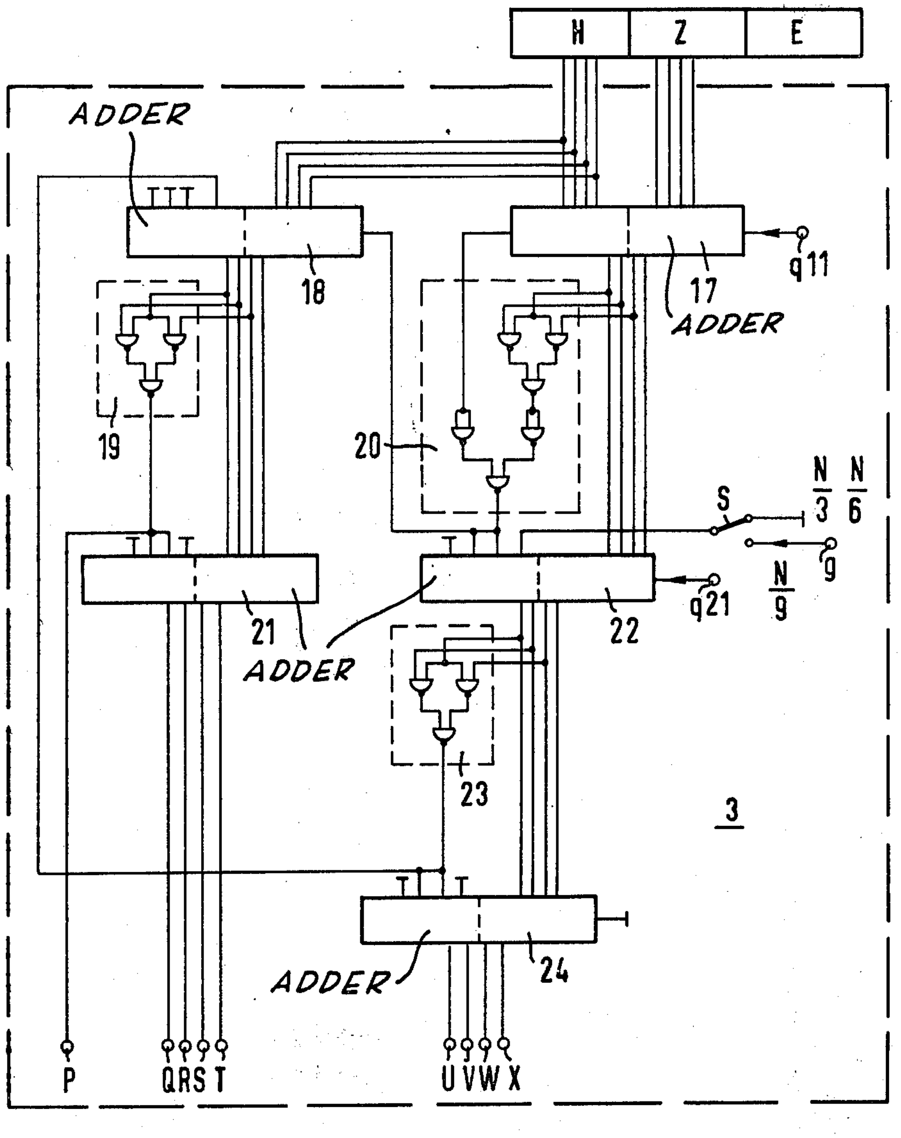
FIG. 3 is a schematic circuit diagram of the second adder of the electronic computer of the invention.

Second adder 3, which determines the integer $n$ from the carrys of the sums of the digits from first adder 1 and the dividend number N, is illustrated in FIG. 3. In order to determine $n$, the following addition must be performed:

$$n = 10\ a_2 + 1\ a_1 + q_{11} + q_{21}$$

In order to achieve this, the hundreds digit H (i.e., $a_2$) is transmitted to the parallel inputs of adder blocks 17 and 18. Adder block 17 combines the hundreds and tens digits $a_2$ and $a_1$. In adder block 18, which adds the higher of the two decades, only the carrys that occur are added to 10 $a_2$. Adder block 17 also adds the carry of the sum of the digits $q_{11}$ to the combination of digits $a_1$ and $a_2$. Recoding networks 19 and 20, coupled to adder blocks 17 and 18, recode the signals by adding the integers 6 and 7, respectively, to the outputs of adder blocks 18 and 17 in adder blocks 21 and 22 coupled thereto. Block 22 also adds the carry of the sum of the digits $q_{21}$. The recoding procedure in adder block 22 also leaves a free two bit input, and an additional integer 1 may be added. Network 23, which is coupled to adder block 22, recodes the output of block 22 by adding the integer 6 to the output thereof in adder block 24. If it is desired that the integer $n$ appear at the output terminals P–X, then the $2^0$ bit position signal of adder block 22 must be maintained at zero so that there is no addition by the adder block. This is accomplished by means of switch S which is coupled to outputs N/3 and N/6 and the $2^0$ bit position of adder block 22. If, however, the quotient N/9, which is equal to ($n$+1), is desired at these output terminals, then switch S is moved to its alternate position wherein it couples block 22 to output terminal $g$ of comparator 2 and quotient N/9 to the $2^0$ bit position of the adder block. Since an output signal is present at output terminal $g$ when the dividend N is divisible by the integer 9, this is equivalent to adding the integer 1 to the other inputs to adder block 22.

Figure 4:
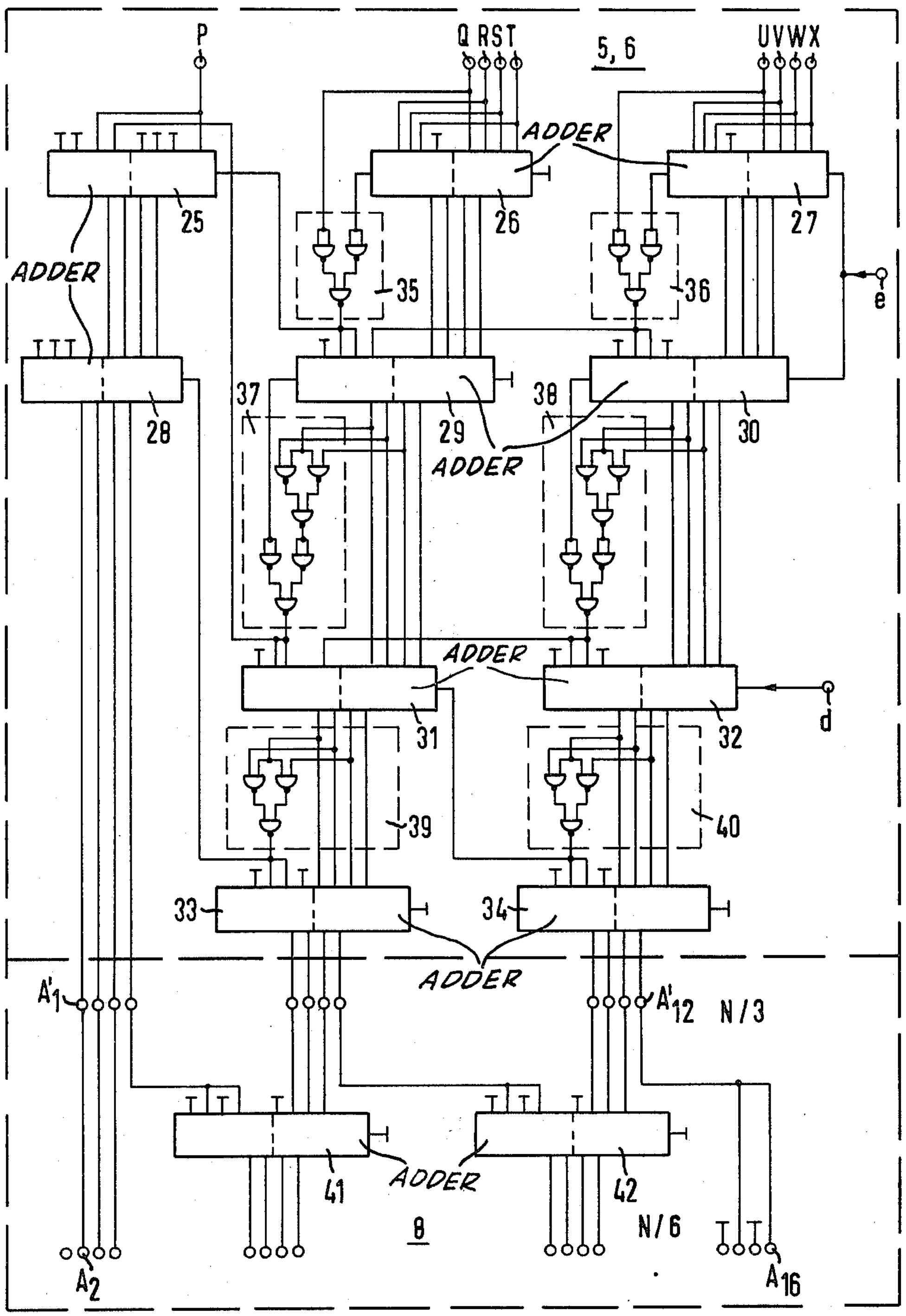
FIG. 4 is a schematic circuit diagram of the multiplier, fourth adder, and the divider of the electronic computer of the invention.

As previously stated, in order to determine the quotients N/3 and N/6, the quotient N/9 must be tripled by multiplier 5. One embodiment of a circuit for carrying out this operation is illustrated schematically in FIG. 4. The multiplication procedure performed by multiplier 5 is reduced in this circuit to the operation $n+2n = 3n$, wherein $2n$ is obtained from the integer $n$ by shifting the digital signal to the left by known methods. The combination of multiplier 5 and adder 6 illustrated in FIG. 4 includes adder blocks 25–34, coupled to networks 35–40, the latter of which recode the binary sums into decade signals by adding to the output of blocks 26, 27, 29 and 30–32 either of the integers 6 or 7. The shift of the digit sum carried out to double the integer $n$ occurs at the inputs of adder blocks 25–27, at which the bit positions of the three decades of the integer $n$ are applied to one of the inputs of adder blocks 25, 26 and 27 according to the value of the digits, and further to the other input thereof one bit position higher than the first input. Bit position $2^3$, which corresponds to output terminals Q and U is transmitted as the integer 16 directly to networks 35 and 36 respectively. Depending upon the value of the tripled integer $3n$ determined from the total sum of the dividend digits $q_r$, the carry inputs of adder blocks 27, 30 and 32 of the lowest decade are used to add the quotient 1/$d$ and the quotient 2/$e$ in adder blocks 27, 30 and 32. In other words, the quotient $q_r/3$ which is equal to the integers 1, 2 or 3 where the dividend N is divisible by the integer 3 can immediately be received by multiplier 5 from comparator 2. The desired quotient N/3, thus, appears at output terminals $A'_1 - A'_{12}$ whenever a signal indicating the divisibility of the dividend N is present simultaneously at output terminal $f$. The quotient N/6 is obtained by the shift of the digital signal to the right by adder blocks 41 and 42, which comprise divider 8, and appears at the output terminals $A_1 - A_{16}$.

Comparator 7 and adder 4, although they have not been illustrated in schematic form, are constructed similar to fourth adder 6 and comparator 2.

The computing device disclosed has application, for example, in the field of weighing technology, when the determination of weight is made by an encoded characteristic quantity instead of by an analog indicator, such as a pointer. In devices for determining the number of a plurality of objects, the total weight is divided by the weight of one object. The inventive device may be used to carry out such a division operation. Also, where the weight of small objects combined with a plurality of objects of different weights is desired to be determined, the inventive device may be used to average weight by weighing 3, 6 or 9 objects simultaneously and dividing the total weight by the number of objects weighed. The inventive device, of course, may be used to carry out many other similar divisions, and the applications recited above are merely exemplary.

While there have been disclosed herein several preferred embodiments of the invention, it will be understood by those persons skilled in the art that many changes and modifications may be made thereunto without departing from the invention, and it is therefore intended in the appended claims to cover all such changes and modifications which fall within the true spirit and scope thereof.

What is claimed is:

1. An electronic computer for the static recognition of the divisibility, and the division, of numbers N which are divisible by the integers 3, 6 and 9, comprising:

means for summing the digits of a dividend N;

means, coupled to said summing means, for indicating the divisibility of the sum of the dividend digits by the integers 3, 6 and 9;

means, coupled to said summing means, for determining an integer *n* which is nearest but less than the quotient of the dividend N divided by the integer 9, from both the carrys of the sum of the dividend digits and the dividend N;

means, coupled to said means for determining said integer *n* and to said indicating means, for determining the quotient of the dividend N divided by the integer 9;

means, coupled to said means for determining said integer *n*, for tripling said integer *n;* means, coupled to said indicating means and said tripling means, for determining the quotient of the dividend N divided by the integer 3; and means, coupled to said means for determining the quotient N/3, for determining the quotient of the dividend N divided by the integer 6.

2. The electronic computer as recited in claim 1, wherein said means for determining the quotient N/9 determines said quotient by summing the integer *n*, and the total sum of the dividend digits divided by the integer 9.

3. The electronic computer as recited in claim 1, wherein said means for determining the quotient N/3 determines said quotient by summing the tripled value of the integer *n*, and the total sum of the dividend digits divided by the integer 3.

4. The electronic computer as recited in claim 1, wherein said means for tripling the integer *n* comprises a multiplier which triples said integer by multiplying the quotient N/9 by the integer 3.

5. The electronic computer as recited in claim 1, wherein said means for determining the quotient N/6 comprises means for determining the evenness of the unit digit of the sum of the integer *n* tripled, and the total sum of the dividend digits divided by the integer 3, and means for dividing the quotient N/3 by the integer 2.

6. The electronic computer as recited in claim 1, wherein said means for summing the digits of the dividend N, said means for determining the integer *n*, and said means for determining the quotients N/9 and N/3 comprise logical adders.

* * * * *